March 14, 1933. W. MOLONEY 1,901,184
FOOT REST DEVICE
Filed Nov. 28, 1931
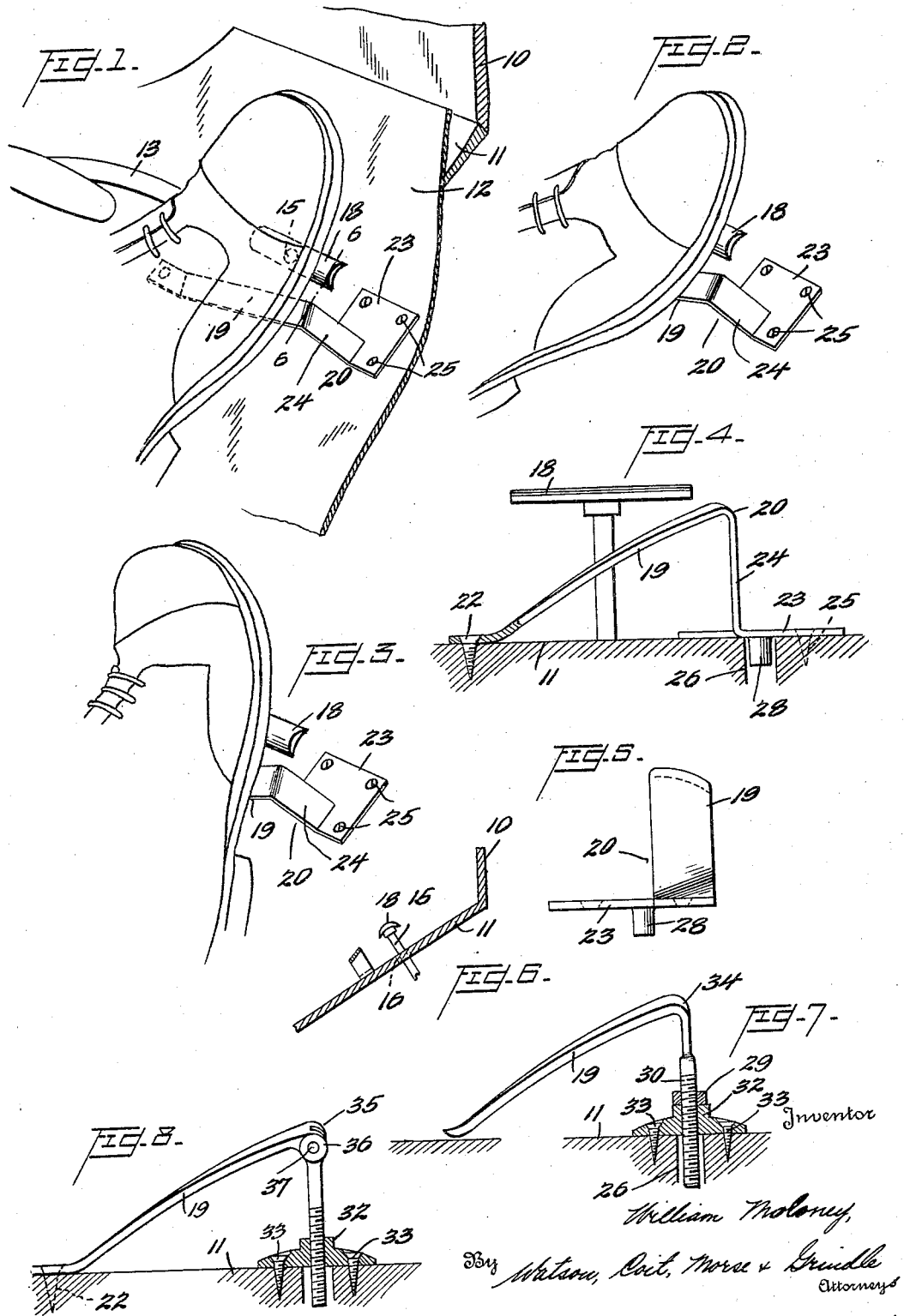

Patented Mar. 14, 1933

1,901,184

UNITED STATES PATENT OFFICE

WILLIAM MOLONEY, OF HAMILTON BEACH, NEW YORK

FOOT REST DEVICE

Application filed November 28, 1931. Serial No. 577,835.

This invention relates to foot levers and accessories therefor and, in its more particular aspect, to such devices as are applied to the operating mechanisms of motor vehicles.

Certain devices of this type which heretofore have been in general use in connection with the accelerator of a motor vehicle have been characterized by the provision of a button or knob secured upon the upper end of the accelerator shaft, and having a relatively small area of contact with the foot of the operator, and also by the provision of a similar button or head upon the end of a rigid substantially vertical rod secured to one of the floor boards of the vehicle in the vicinity of the accelerator pedal.

Other foot rest devices have also been employed which have been provided with greater foot contacting areas and which have also been disposed between the driver and the accelerator pedal, but all of them have been more or less objectionable as being uncomfortable and tiring to the foot and leg of the driver during long trips and also in permitting unnecessary vibration or rocking of the foot during the passage of the vehicle over a rough or uneven surface, thus causing the unpleasant "bucking" or jerking movement of the vehicle especially noticeable when a beginner is learning to drive.

The present invention, on the other hand, in its illustrated embodiment, contemplates the provision of an accelerator pedal of considerably greater lateral extent than those heretofore used, together with a cooperating laterally inclined foot rest or guide, which arrangement will enable the foot to assume a variety of different restful positions during the operation of the vehicle at a uniform speed, and will permit the depression of the accelerator pedal by the mere lateral shifting of the foot upon the inclined guide surface thereof instead of the unsteady and awkward rocking or bending movement of the ankle as practiced in connection with the earlier devices referred to.

Besides affording means whereby the foot may assume different driving positions, the device is of especial benefit to women who have small feet and experience difficulty in effectively bridging the space between the rest and the pedal in older constructions.

It is the general object of the invention to provide an improved device of this description which is inexpensive to manufacture, easy to install, and adapted to afford increased comfort and facility in the operation of a foot lever or pedal.

Another object of the invention is to provide, in association with a pedal, a rest or fulcrum having an inclined foot contacting or gauging surface.

A further object is to provide, in conjunction with such an arrangement, means for securing the foot rest or guide to a supporting structure and means for readily effecting the adjustment of the position of said foot rest or guide with respect to the pedal with which it is associated.

A still further object of the invention is to provide an accelerator pedal for motor vehicles, the foot contacting portion of which is extended laterally a considerable extent as compared with those now in use which comprise merely a circular button surmounting the shaft.

Further objects and features of novelty will be apparent from the following specification when read in connection with the accompanying drawing in which certain embodiments of the invention are illustrated by way of example.

In the drawing:

Figure 1 is a fragmentary view in perspective of the forward left-hand interior portion of the body of a motor vehicle illustrating the installation and operation of a device embodying the principles of the present invention;

Figure 2 is a perspective view of the same device illustrating a different position of the foot during operation;

Figure 3 is a perspective view showing the foot in still another position;

Figure 4 is a vertical transverse cross sectional view through the floor board showing one embodiment of the foot rest partly in elevation and partly in cross section;

Figure 5 is a view in end elevation of the same embodiment of the foot rest device as seen from the left-hand side of Figure 4;

Figure 6 is a cross sectional view taken on line 6—6 of Figure 1;

Figure 7 is a view, partly in front elevation and partly in transverse cross section, of a modified form of foot rest; and Figure 8 is a similar view of a further modification.

Referring now to Figure 1 of the drawing, the numeral 10 refers to the dash of a motor vehicle, and the numeral 11 designates the inclined floor boards usually disposed between the main floor of the interior of the vehicle and the dash. A suitable mat or floor covering is shown at 12. The usual brake pedal is shown at 13, and, as more clearly illustrated in Figure 6, the usual accelerator pedal or shaft 15 is adapted to pass through an opening 16 in the floor board 11. As one of the features of the present invention, the accelerator shaft 15 is provided at its upper end with a foot contacting head or strip 18 of considerable lateral extent.

Disposed with its body portion 19 in front of and substantially parallel to the member 18 is the novel foot rest or guide, which is designated generally by the numeral 20. As clearly shown in the drawing, the body portion 19, providing a gauging surface for contacting with the foot, is inclined laterally and upwardly from left to right. The lower inner end of the device may be secured to the floor board 11 as, for example, by means of the screw 22, and the opposite higher end of the foot rest is connected to a securing plate 23 by means of the substantially vertical integral portion 24. The plate 23 is fastened to the floor boards by suitable elements such as the screws 25. Generally in connection with the foot rest devices which are originally supplied with the vehicle, there is provided a hole in the floor board 11, such as that shown at 26 in Figure 4, and this furnishes a convenient means for locating and securing the base plate 23 against displacement, the base plate 23 in the example shown in Figs. 4 and 5 being provided for this purpose with an integrally formed projection or dowel pin 28.

It will also be noted that the inclined body portion 19 of the foot rest 20 is twisted slightly transversely of its length, the inclination of this portion gradually increasing from its lower end toward the upper end thereof. The combined longitudinal and transverse slope or inclination of the foot contacting portion of the foot rest has been found to be very adaptable to differing positions of the foot during driving. The adaptability of the device is illustrated particularly in Figures 1, 2, and 3. In Figure 1, the foot is shown in normal operating position with the heel and toe either in a straight line or with the toe pointing slightly outwardly toward the right. This nearly straight position may, of course, be varied by moving the foot either forwardly or rearwardly in a substantially straight line. For the purpose of resting the foot and leg, the position shown in Figure 2 may be assumed, in which the foot makes quite a wide angle with the longitudinal line of the car with the toe pointing still further outwardly toward the right. Figure 3 illustrates another position of the foot wherein the toe is inclined inwardly at the opposite angle from that shown in Figure 2.

It will be readily understood that any of these positions and other intermediate positions may be assumed at any given degree of depression of the accelerator pedal with the result of attaining greater driving comfort and ease especially during a long trip. In addition to the provision of means enabling these variations or changes in the position of the foot during a given speed, the present device also permits the depression of the accelerator pedal by merely sliding the foot laterally along the head strip 18 of the accelerator shaft and at the same time depressing the foot so that the edge of the sole of the shoe follows the inclined gauging surface of the member 20, thus affording means for accomplishing a steadier and more accurate movement of the foot in depressing the pedal than it is possible to attain when the foot must be angled or fulcrumed in vertical planes either laterally or longitudinally of the car as in prior constructions. For this purpose the surfaces of the strip 18 and the member 20 should be so smooth that the contact of the foot therewith is as near frictionless as possible. This, of course, is of particular importance at times when the vehicle is passing over a rough or uneven surface. The operation of the device is comparable to that of the maulstick used by artists or sign painters.

Stated somewhat differently, the advantage of this arrangement lies in the fact that the device gives a more accurate control of the vertical movement of the foot accelerator by resolving a part of the vertical force applied by the foot into a horizontal component and thereby making possible a steadier actuation of the accelerator.

In order to provide means for adjusting the height of the foot rest to accommodate it to accelerator shafts of different lengths, certain modifications of the device have been provided as illustrated in Figures 7 and 8 of the drawing. In Figure 7, the inclined body portion 19 of the rest is formed in exactly the same way as in the embodiment previously described, but the vertical member 24 is replaced by a threaded bolt 30 which is adapted to pass through the opening 26 in the floor board 11. A nut 32 is threaded upon the bolt 30 and is adapted to be rotated thereon until the proper height of the foot rest is attained, whereupon the nut 32 is secured to the floor board 11 as by means of the screws 33. In this embodiment it is preferred that the lower end of the foot contacting member 19 be unattached to the floor and that the connection be made entirely through the threaded shaft 30 and the nut 32. For the purpose of rigidifying this connection whereby the foot rest may be held in the desired vertically adjusted position, there is provided the lock nut 29 which is tightened on the threaded member 30 firmly against the top of the flanged nut 32. It will be seen that this modification provides a single convenient means for adjustably securing the foot rest.

An important feature of the embodiments already described is found in the fact that there are no relatively moving parts involved which would give rise to objectionable squeaks or noises and require frequent lubrication.

The embodiment illustrated in Figure 8 varies from that shown in Figure 7 only in the provision of hinged connected 35, provided by the hinge lugs 36 and the pintle 37, and the securing of the lower end of the device at 22 as in the case of the embodiment first described.

Various changes and modifications may be made in the device as illustrated and described without departing from the scope of the invention as defined in the following claim.

Having thus described the invention, what is claimed as new and desired to be secured by Letters Patent is:

In a device of the class described, in combination, a motor vehicle accelerator pedal comprising a movable part provided with a head curved in cross section and having a smooth foot contacting surface and laterally extending flanges, and a separately formed foot guiding member spaced rearwardly of said pedal and secured to the floor of said vehicle, said member also being of considerable lateral extend and provided with a smooth laterally and downwardly inclined foot contacting surface, whereby a downward pressure of the foot of an operator will cause the foot to slide laterally to gradually depress said pedal.

In testimony whereof I hereunto affix my signature.

WILLIAM MOLONEY.